United States Patent
Jebb

(10) Patent No.: US 8,457,199 B2
(45) Date of Patent: Jun. 4, 2013

(54) VIDEO CODING

(75) Inventor: Timothy R Jebb, Suffolk (GB)

(73) Assignee: BRITISH TELECOMMUNICATIONS plc, London (GB)

( * ) Notice: Subject to any disclaimer, the term of this patent is extended or adjusted under 35 U.S.C. 154(b) by 1434 days.

(21) Appl. No.: 11/916,489

(22) PCT Filed: Jun. 1, 2006

(86) PCT No.: PCT/GB2006/001999
§ 371 (c)(1),
(2), (4) Date: Dec. 4, 2007

(87) PCT Pub. No.: WO2006/131700
PCT Pub. Date: Dec. 14, 2006

(65) Prior Publication Data
US 2008/0192826 A1    Aug. 14, 2008

(30) Foreign Application Priority Data
Jun. 8, 2005 (EP) ..................................... 05253512

(51) Int. Cl.
*H04N 7/12* (2006.01)

(52) U.S. Cl.
USPC ............. 375/240.12; 375/240.27; 375/240.23

(58) Field of Classification Search
USPC ............. 375/240.12, 240.13, 240.27, 240.23;
348/415.1, 417.1, 418.1, 425.2
See application file for complete search history.

(56) References Cited

U.S. PATENT DOCUMENTS

| | | | | |
|---|---|---|---|---|
| 4,437,119 A * | 3/1984 | Matsumoto et al. | ...... | 375/240.13 |
| 5,422,676 A * | 6/1995 | Herpel et al. | ............ | 375/240.24 |
| 5,481,310 A * | 1/1996 | Hibi | .......................... | 375/240.14 |
| 5,703,889 A * | 12/1997 | Shimoda et al. | .............. | 714/809 |
| 5,731,840 A | 3/1998 | Kikuchi et al. | | |
| 6,004,028 A * | 12/1999 | Bottomley | .................... | 714/758 |
| 6,657,361 B1 * | 12/2003 | Morales Serrano et al. | ........................ | 310/316.01 |
| 6,744,924 B1 * | 6/2004 | Hannuksela et al. | ......... | 382/232 |

(Continued)

FOREIGN PATENT DOCUMENTS

| | | |
|---|---|---|
| JP | 8-251596 | 9/1996 |
| JP | 2001-168731 | 6/2001 |
| KR | 2004-0000199 A | 1/2004 |

OTHER PUBLICATIONS

Martini, M. G., et al., "Joint Source-Channel Error Detection with Standard Compatibility for Wireless Video Transmission," Wireless Communications and Networking Conference, 2002, IEEE, vol. 1, Piscataway, New Jersey, USA, pp. 215-219 (Mar. 17-21, 2002), XP010585765.

(Continued)

*Primary Examiner* — Ricky Ngo
*Assistant Examiner* — Dewanda Samuel
(74) *Attorney, Agent, or Firm* — Nixon & Vanderhye PC

(57) ABSTRACT

A video signal is coded by generating, at a transmitter, a difference signal (at 2) representing the differences between a picture to be transmitted and a predicted picture based on a stored locally decoded picture. This is decoded to generate a fresh locally decoded picture. The transmitter also generates a check signal, such as a CRC, as a function of the locally decoded picture. The receiver decodes the difference signal to create a decoded picture. It compares the decoded picture with the check signal, and generates an error signal if the two do not tally.

9 Claims, 1 Drawing Sheet

U.S. PATENT DOCUMENTS

Figure 1:
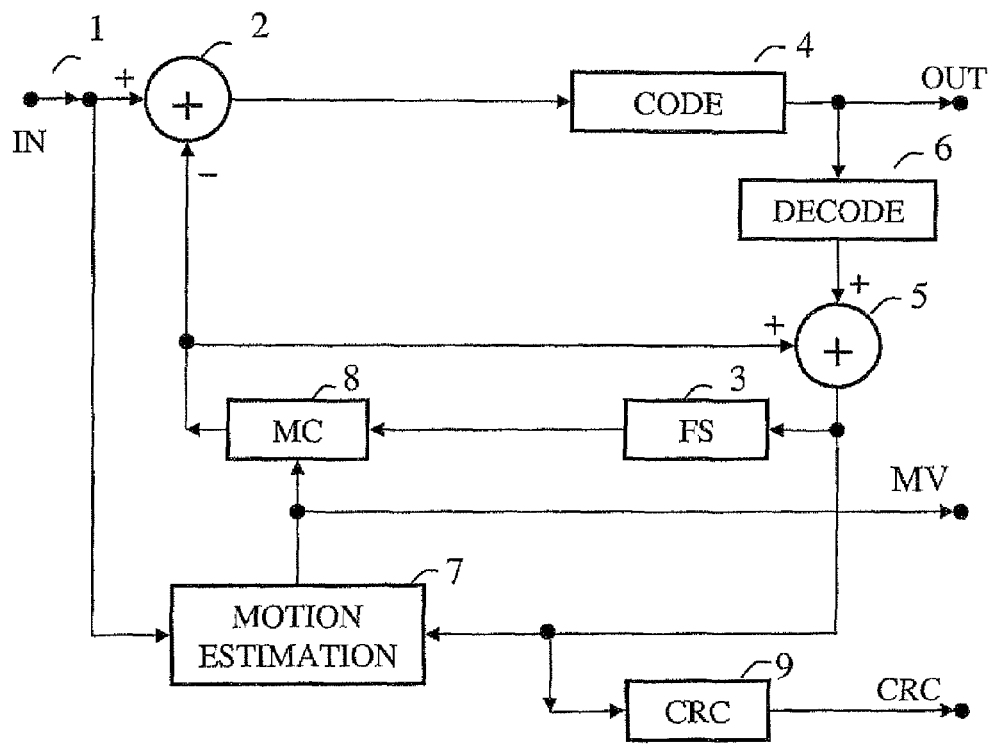

| | | | | |
|---|---|---|---|---|
| 7,231,587 | B2 * | 6/2007 | Novotny et al. | 714/807 |
| 7,613,256 | B2 * | 11/2009 | van Veen et al. | 375/340 |
| 8,068,542 | B2 * | 11/2011 | Nakagawa et al. | 375/240.16 |
| 2001/0014128 | A1 * | 8/2001 | Nagai et al. | 375/240.27 |
| 2004/0008631 | A1 | 1/2004 | Kim | |

OTHER PUBLICATIONS

Rane, S., et al., "Systematic Lossy Forward Error Protection for Error-Resilient Digital Video Broadcasting," Proceedings of the SPIE, Bellingham, VA, USA, SPIE-IS&T/vol. 5308, No. 1, pp. 588-595 (Jan. 20, 2004), XP008046985.

"Information Technology—Generic Coding of Moving Pictures and Associated Audio Information: Systems. Technologies De L'Information—Codage Des Images Animees Et Du Son Associe: Systems," International Standard ISO/IEC, vol. 13818-1, pp. I-XY, 1 (Apr. 15, 1996), XP000667435.

Strachan, D., et al., "EDH—Error Detection and Handling in Digital Television," SMPTE Journal, pp. 662-665 (Oct. 1995).

EP office action issued Apr. 19, 2011, in EP 06 744 058.6-2223.

Japanese Office Action dated Feb. 7, 2012, issued in JP 2008-515275 (with English translation).

Korean Office Action dated Jul. 30, 2012 corresponding to Korean Patent Application No. 7029987/2007. (with English summary and responsive instructions in English).

English translation of Office Action in KR Patent Application No. 2007-7029887 dated Feb. 28, 2013.

* cited by examiner

VIDEO CODING

This application is the U.S. national phase of International Application No. PCT/GB2006/001999 filed 1 Jun. 2006 which designated the U.S. and claims priority to EP 05253512.7 filed 8 Jun. 2005, the entire contents of each of which are hereby incorporated by reference.

The present invention concerns video coding, particularly, though not exclusively, in the context of video encoders employing inter-frame differential coding. It concerns monitoring the system for errors. It is known, for example from Martini, M. G. & Chiani, M.; "Joint source-channel error detection with standard compatibility for wireless video transmission", Wireless Communications and Networking Conference, 2002. WCNC2002. 2002 IEEE, Volume 1, 17-21 Mar. 2002 Page(s): 215-219, to generate, from the encoded signal, a check signal such as a cyclic redundancy check (CRC) which can be compared with the signal received at a decoder. However, this approach can detect only those errors that occur on the transmission path. Rane, S. et al, "Systematic Lossy Forward Error Protection for error-Resilient Digital Video Broadcasting", Proceedings of the SPIE, vol. 5308, no, 1 (20th Jan. 2004) pp. 588-595, on the other hand, describes a system in which a transmitter encodes a video signal using a first encoder and generates a locally-decoded video signal which is then recoded using a second video encoder that uses coarser quantisation, followed by Reed-Solomon coding. The Reed-Solomon parity symbols are sent to a receiver. Under error conditions, the receiver decodes the received first encoded signal, recodes it using the coarser quantisation, applies Reed-Solomon error correction and decodes the result. This system does not explicitly produce a warning of errors, but more importantly is unsatisfactory in that many errors will be masked by the coarser quantisation and thus cannot be detected.

According to one aspect of the invention there is provided an apparatus for coding video signals comprising video coding means, local decoding means operable to produce a locally decoded picture and means for generating a check signal as a function of all the bits of the locally decoded picture, such that the check signal obtained in the presence of any single error is always different from that obtained from an error-free picture.

In another aspect, we provide method of transmitting a video signal comprising, at a transmitter, generating an encoded video signal, decoding the encoded video signal to produce a locally decoded picture, generating a check signal as a function of all the bits of the locally decoded picture, such that the check signal obtained in the presence of any single error is always different from that obtained from an error-free picture, and transmitting the difference signal and the check signal to a receiver.

Other aspect of the invention are set forth in the subclaims.

Figure 2:
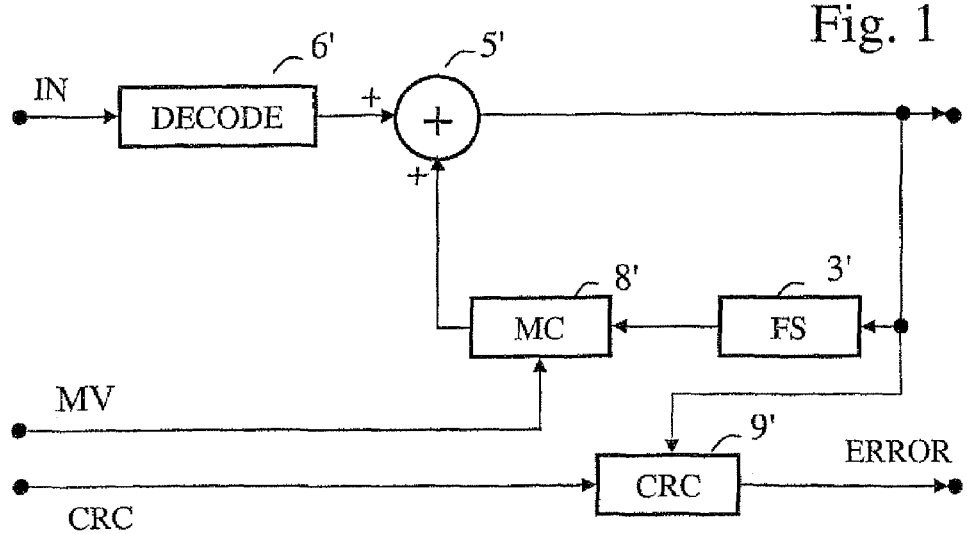

Some embodiments of the present invention will now be described, by way of example, with reference to the accompanying drawings, in which FIG. 1 is a block diagram of an encoder in accordance with the invention and FIG. 2 is a block diagram of the corresponding decoder, FIG. 1 shows a video encoder. Video signals (commonly in digital form) are received at an input 1. A subtractor 2 forms the difference between the input and a predicted signal from a frame store 3 which is then further coded in box 4. The coding performed here is not material to the present invention, but may include thresholding (to suppress transmission of zero or minor differences) quantisation, transform coding and/or variable length coding, for example. The input to the frame store is the sum, formed in an adder 5, of the prediction and the coded difference signal decoded in a local decoder 6 (so that loss of information in the coding and decoding process is included in the predictor loop).

The differential coding is essentially inter-frame, though intra-frame coding may from time to time be used (either for a whole frame or for selected blocks of the frame) so as to limit the propagation of transmission errors. The prediction could simply consist of a one-frame delay provided by the frame store 3; as shown however a motion estimator 7 is also included. This compares the frame of the picture being coded with the previous frame in the frame store 3. For each block of the current frame (into which the picture is regarded as divided) it identifies that region of the previous frame which the block most closely resembles. The vector difference in position between the identified region and the block in question is termed a motion vector (since it usually represents motion of an object within the scene depicted by the television picture) and is applied to a motion compensation unit 8 which serves to shift the identified region of the previous frame into the position of the relevant block in the current frame, thereby producing a better prediction. This results in the differences formed by the subtractor 2 being, on average, smaller and permits the coder 4 to encode the picture using a lower bit rate than would otherwise be the case.

FIG. 2 shows a decoder. Firstly, any of the coding operations performed in box 4 are reversed in box 6' (which is identical to box 6 of FIG. 1) to produce an inter-frame difference signal. This then added to a prediction from a frame store 3' after motion compensation in a motion compensation unit 8' which receives the motion vectors from the encoder. The output of the adder 5' forms the decoder output and is also fed to the input of the frame store 3'.

Although not shown, buttering may be provided, as is conventional, at the encoder output and decoder input to permit transmission over a constant bit-rate channel.

As so far described, these arrangements are conventional. In addition, however, the encoder includes a check bit generator 9 which receives, in turn, each locally decoded frame from the adder 5 and generates one or more check bits, which are sent to the decoder along with the coded data and the motion vectors.

The decoder has a checking unit 9' which receives the check bit(s) and each locally decoded frame from the adder 5' and verifies that they tally. This may simply consist of generating a local check bit or bits using the same method as the encoder, and comparing the result with that/those received from the encoder. If they do not match, an alarm signal is generated.

Any form of check bit or bits can be used: what is needed is a signal which is a function of the bits stored in the frame store 3 (or 3') and which is different if the frame from which it is generated contains an error. A single parity bit will perform this function, but such parity checking is of value only when error rates are very low, since it fails to register an error when two errors occur in the same frame.

Another option is the use of a hash function. We prefer to use a cyclic redundancy check (CRC). Here the frame in the frame store is represented by M bits and these M bits are regarded as an M-bit binary number which is then divided, modulo-2, by a generator polynomial G. The remainder after this division is the required string of check bits. One example of a suitable CRC is the 32 bit CRC described in Annex A of the MPEG-2 standard ISO/IEC 13818-1:1996 (page 81).

The invention will work with a wide range of video encoders. Note however that problems can arise with systems using transform coding that is not defined as a bit-exact process.

One example of this is systems operating according to the MPEG-2 standard. If the decoding in units 6 and 6' is identical, there is no difficulty, but usually this will only occur if they are implemented by the same manufacturer or using the same or chip set, for example.

In general, an encoder and decoder both complying with the standard may use floating point arithmetic or different fixed-point arithmetic which gives rise to slightly different rounding errors at the two ends and the two decoded frames from the adders 5, 5' will differ slightly. Although this will not be noticeable to the viewer of a picture, it will cause the CRC check to generate an error signal. Systems specifying bit-exact arithmetic (such as H.264) do not suffer from this problem. Note that the H.264 standard includes a specification for a "Supplemental Enhancement Information" (SEI) message, which is intended to be used for purposes such as maintaining picture quality While these messages do not specifically include picture checksum information, they allow for user defined messages (which may optionally be registered via a process defined by the ITU). SEI messages also provide a mechanism for associating the additional information with the relevant picture(s). Thus the SEI mechanism could be used for transmitting and using picture checksum information.

If desired a parity, CRC or other check may also be performed on the transmitted and received bitstream. This will not however, eliminate the need for the check at 9' because although a check on the bit stream will identify errors as they occur, it will not indicate whether there are errors in the frame store 3'. Such errors, once present, can of course persist until such time as an intra coded frame (or block) is received.

In practice, the error signal could if desired be sent back to the transmitter end. A high is degree of confidence as to picture correctness could be achieved by the use of checksums. A typical scenario would be:
 The encoder system calculates a (say) 32 bit checksum for each reconstructed picture, using the value of every Y, U and V pixel in that picture
 The checksum is transmitted to the set top box along with the bitstream, and with sufficient information to enable the checksum to be associated with the relevant picture.
 The decoder in the set top box decodes the picture. The set top box calculates the checksum of the decoded picture, and compares it with that produced by the encoder.
 If the values match, then the set top box increments counters such as number of correct pictures decoded
 If the checksums do not match, then an error has occurred. The set top box issues an error notification to a central management function, which collates such information and takes corrective action when deemed necessary.

Note that in some systems not all frames are used as predictors for coding of other frames: for example in the MPEG-2 standard, a B-frame, though coded using inter-frame differential coding techniques, is never itself used as a reference frame for the coding of another frame. Thus, a conventional MPEG-2 encoder does not need to decode the B-frames since it has no need of the result. In this situation, there are essentially two options. One option is that check bits would be generated at the encoder (and checked at the decoder) only for those frames which are in any case decoded for the purpose of prediction. This would mean that not all pictures are checked for correctness, but non-reference pictures are of course less important for picture quality as any errors they contain will not persist. The other option is that those frames not required for prediction purposes are nevertheless decoded, and check bits produced for them, even though they are not required for any other purpose.

In particular, it is possible to envisage a system in which no inter-predicted frame is used as a reference frame for inter-frame coding(e.g. one that transmits intra-coded and inter-coded frames alternately) in which case the local decoding at the encoder end would be performed solely for the purpose of generating check bits.

In fact, the invention may be used in systems that do not use predictive coding at all. Thus with any form of video coding, the coded video signal may be locally decoded at the encoder and the locally decoded picture used to generate a CRC or other check signal for transmission to a receiver for verification purposes. This provides a higher degree of security than simply checking the transmitted bitstream, since it can flag up errors arising from problems within the coding or decoding processes as well as those arising from transmission errors.

Some standards, such as H.263 and H.264 allow the use of a loop filter. This is a filter that operates inside of the coding loop. It sits between the output of the adder 5 (OR 5') and the input to the frame store 3 (OR 3'). The pictures shown to the viewer would usually be taken from the output of the filter. We prefer to perform the CRC operation on the filtered signal, though in fact either the filtered or the unfiltered signal could be chosen (as long as the same is done at the encoder and at the decoder).

Note also that it would be possible to take the input to the CRC process from the output of the frame store 3 or 3' (or indeed from the outputs of the motion compensation units 8, 8'), though naturally this would not apply to non-reference frames since they would not be stored.

According to the above description, the CRC or other check signal is generated once per frame. However this is not essential: it could be generated less frequently, perhaps once for every pair or group of frames. Conversely, it may be generated more often, e.g. once for each macroblock or by providing for each frame separate CRCs for the motion vectors and the difference data.

The checks described here lend themselves to end to end system verification. That is, to detect transmission problems and receiving-end problems, including a decoder that has some bugs (or not enough processing power to keep up at all times). The CRC technique for example might allow a set top box containing the decoder to feed back statistics to a server (both ACK and NACK types), so the server could maintain records of how well the receiver has presented the content to the viewer. In the event of users' complaints about quality, such a system would allow a service provider to distinguish between transmission and decoding problems as distinct from all other problems including content badly encoded on the server, or problems with other equipment at the receiving end.

The invention claimed is:
1. An apparatus for coding video signals comprising:
 a video coder,
 a local decoder operable to produce a locally decoded picture, and
 a check signal generator configured to generate a check signal as a function of all the bits of the locally decoded picture, such that the check signal obtained in the presence of any single error is always different from that obtained from an error-free picture, wherein
 the video coder comprises a frame store for storing a locally decoded picture and inter-frame coder configured to generate a difference signal representing the differences between a picture to be transmitted and a predicted picture based on the stored locally decoded picture, the inter-frame coder is configured to perform predictive coding of pictures that are not to be used as a basis for predictive coding of another frame, and the local decoder is configured to decode such non-reference pictures so that the check signal generator generates check signals for them.

2. An apparatus according to claim 1 in which the check signal is a cyclic redundancy check signal.

3. An apparatus according to claim 1 in which the video coder is configured to employ predictive coding.

4. An apparatus according to claim 1 in which the check signal is generated only in respect of pictures that are to be used as a basis for predictive coding of another frame.

5. A method of transmitting a video signal comprising, at a transmitter:

generating an encoded video signal, decoding the encoded video signal to produce a locally decoded picture and generating a check signal as a function of all the bits of the locally decoded picture, such that the check signal obtained in the presence of any single error is always different from that obtained from an error-free picture, and transmitting the check signal to a receiver, wherein the encoded video signal further includes a difference signal representing the differences between a picture to be transmitted and a predicted picture based on the stored locally decoded picture; and performing predictive coding of pictures that are not to be used as a basis for predictive coding of another frame, and comprising locally decoding such non-reference pictures and generating check signals for them.

6. A method according to claim 5 further comprising, at a receiver:

decoding the received signal to create a decoded picture, comparing the decoded picture with the check signal, and generating an error signal if the decoded picture and check signal do not tally.

7. A method according to claim 5 in which the check signal is a cyclic redundancy check signal.

8. A method according to claim 5, in which the video coding uses predictive coding.

9. A method according to claim 1 in which the check signal is generated only in respect of pictures that are to be used as a basis for predictive coding of another frame.

\* \* \* \* \*

UNITED STATES PATENT AND TRADEMARK OFFICE
CERTIFICATE OF CORRECTION

PATENT NO.        : 8,457,199 B2                                           Page 1 of 1
APPLICATION NO. : 11/916489
DATED             : June 4, 2013
INVENTOR(S)       : Timothy R Jebb It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1403 days.

Signed and Sealed this
Eighth Day of September, 2015

Michelle K. Lee
*Director of the United States Patent and Trademark Office*